United States Patent [19]

Kim

[11] Patent Number: 4,729,507

[45] Date of Patent: Mar. 8, 1988

[54] EASILY OPENABLE REUSABLE ENVELOPE

[76] Inventor: Frank Y. H. Kim, 60 N. Beretania St. #2202, Honolulu, Hi. 96817

[21] Appl. No.: 894,467

[22] Filed: Aug. 1, 1986

[51] Int. Cl.⁴ .................................................. B65D 27/06
[52] U.S. Cl. ........................................ 229/73; 206/610
[58] Field of Search .................... 206/610, 620, 629; 229/73, 81

[56] References Cited

U.S. PATENT DOCUMENTS

| | | |
|---|---|---|
| 26,378 | 12/1896 | Brobst . |
| 304,662 | 9/1884 | Pedrick . |
| 669,203 | 3/1901 | Kleinfeldt . |
| 717,993 | 1/1903 | Hinchman . |
| 780,883 | 1/1905 | Hinchman ............................ 206/620 |
| 890,538 | 6/1908 | Stillwell . |
| 1,044,935 | 11/1912 | Snider . |
| 1,306,224 | 6/1919 | Godley . |
| 1,336,646 | 4/1920 | Mendenhall ......................... 206/629 |
| 2,129,705 | 9/1938 | Reineman ............................... 229/73 |
| 2,410,438 | 11/1946 | Fields ................................... 206/620 |
| 2,747,788 | 5/1956 | Tilly ..................................... 206/629 |
| 3,322,329 | 5/1967 | Castaneda et al. ................... 206/629 |
| 3,392,905 | 7/1968 | Caldwell . |
| 3,620,441 | 11/1971 | Robbins ................................ 229/85 |
| 3,650,463 | 3/1972 | Christiansen et al. ................ 229/81 |
| 3,652,008 | 3/1972 | Grotefend ............................. 229/85 |
| 3,724,741 | 4/1973 | Jacobson .............................. 206/629 |
| 4,093,074 | 6/1978 | Bielawski ............................. 206/629 |
| 4,166,538 | 9/1979 | Nixon et al. ......................... 206/629 |
| 4,192,420 | 3/1980 | Worrell et al. ....................... 206/629 |
| 4,470,511 | 9/1984 | Meeker et al. ....................... 206/610 |
| 4,607,749 | 8/1986 | Jacob ................................... 206/610 |

FOREIGN PATENT DOCUMENTS 2101528 1/1983 United Kingdom .................. 229/73

*Primary Examiner*—Stephen P. Garbe

[57] ABSTRACT

An improved adhesive sealed envelope is provided with a tear away portion extending there across in an area of the back panel lying under the adhesive seal of the top flap when the envelope is sealed, the tear line defining the tear away portion being hidden by the top flap. The envelope is opened in the natural way by grasping the flap and pulling upwardly causing the envelope to open along the tear line, thereby creating a larger access opening.

4 Claims, 14 Drawing Figures

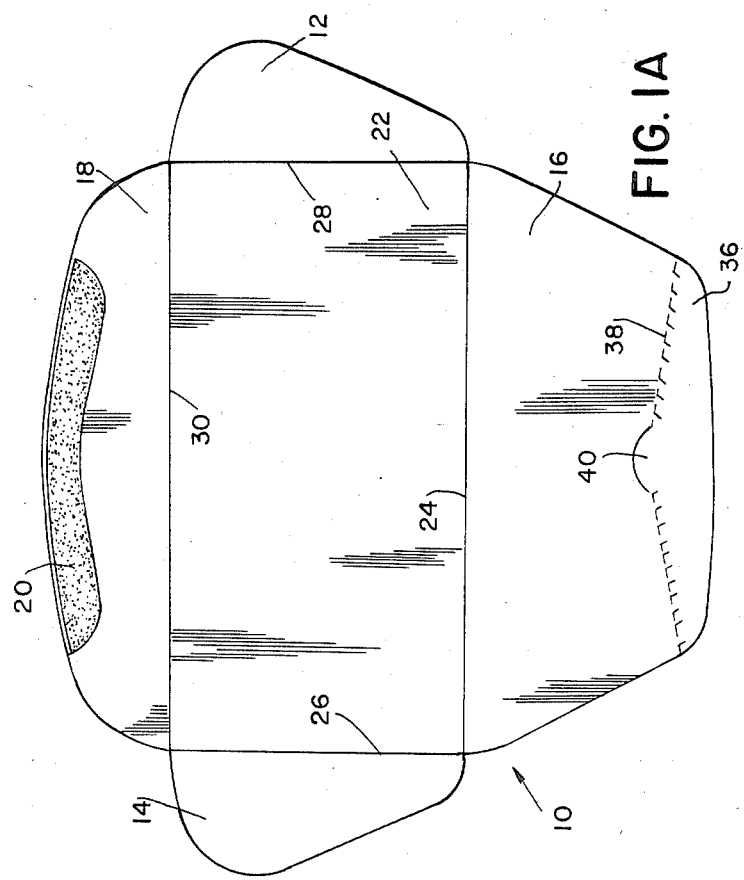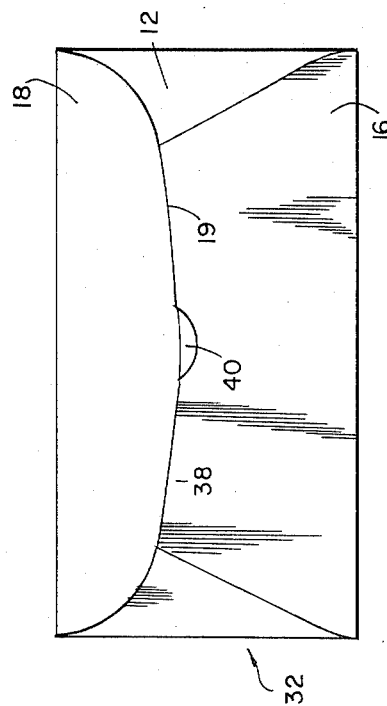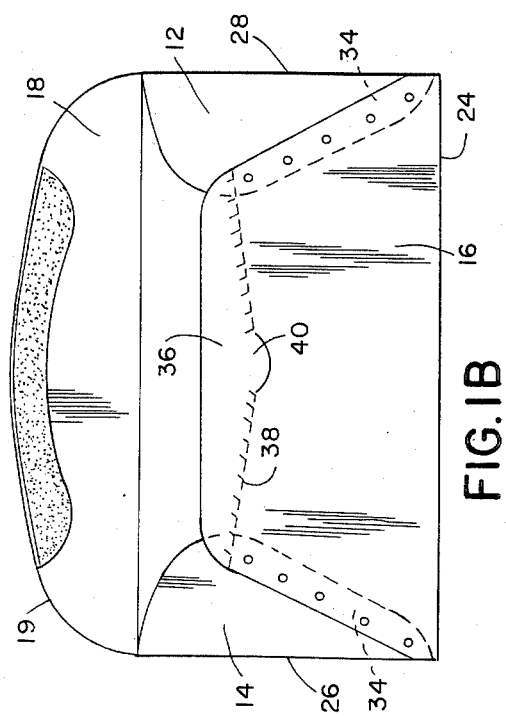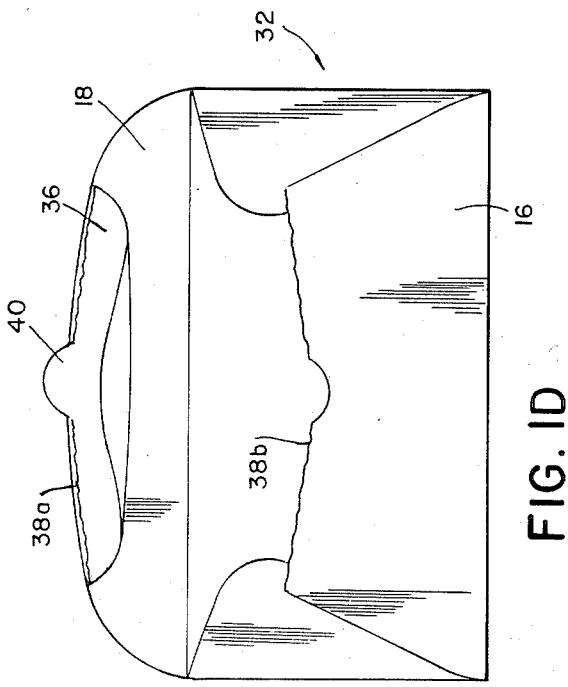

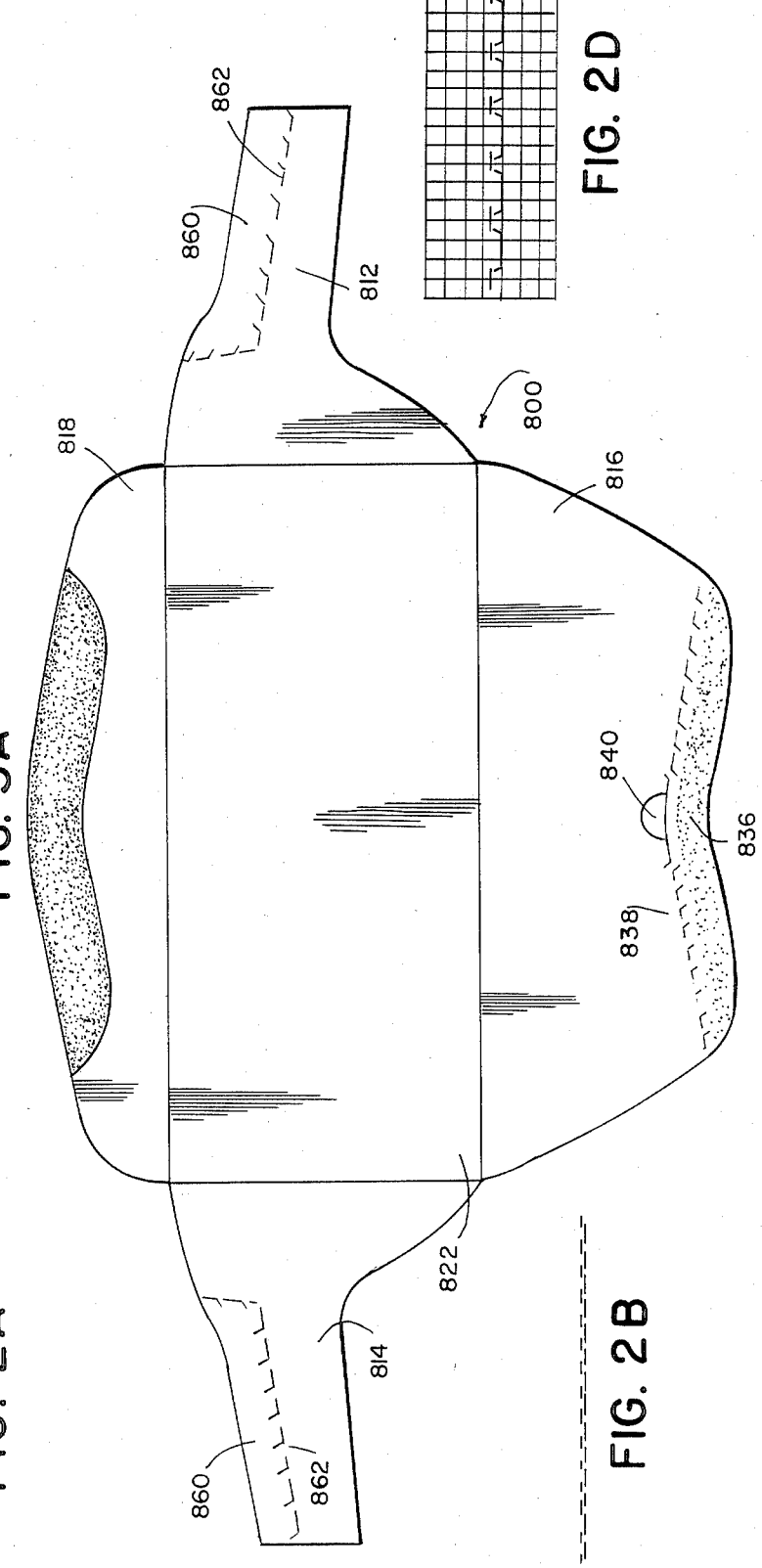

EASILY OPENABLE REUSABLE ENVELOPE

FIELD OF INVENTION

The present invention relates to improved envelopes and, more particularly, to envelope constructions which have hidden tearable structures.

BACKGROUND OF THE INVENTION

Envelopes having perforated sections to facilitate the opening thereof have been long known, although most of the prior structures contemplated have not achieved much success. Perhaps those which have achieved the greatest success are those which embody tear strips of various kinds, and these are especially used in larger envelopes and small sealed mailing boxes. The recent advent of computer generated mail has also led to the increased use of certain types of form envelopes having tearable portions for facilitating opening, or tear strips with pull tabs.

There are many reasons why the prior constructions have not achieved great success, particularly in common envelopes as compared with envelopes used for the mailing of computer generated material. Among these reasons are aesthetic insufficiencies in the prior constructions; constructions which are too complex and thus too expensive to manufacture and sell at a reasonable price; the use of inadequate tear lines which comprise a single line or series of co-linear cuts, scores or perforations, leading to poor tearability; and the use of exposed tear lines which are subject to accidental tearing.

Among the problems which the prior envelopes have is that they are often difficult to open in spite of being provided with tear lines. Sometimes these envelopes are possible to open, but not quickly. Some of the prior envelopes cannot be opened safely without damaging the contents. In some cases, even though the envelope may be easy to open, it is nevertheless difficult to remove the contents.

Among the patent literature, prior constructions having exposed tear lines are shown by Pedrick U.S. Pat. No. 3,046,662; Robbins U.S. Pat. No. 3,620,441; Grotefend U.S. Pat. No. 3,652,008; Nixon et al U.S. Pat. No. 4,166,538 and Meeker et al U.S. Pat. No. 4,470,511. Patents which show tear strips in which the tear lines are exposed include Stillwell U.S. Pat. No. 890,538; Snider U.S. Pat. No. 1,044,935; Caldwell U.S. Pat. No. 3,392,905 and Christiansen et al U.S. Pat. No. 3,650,463. The Kleinfelot U.S. Pat. No. 669,203 shows both these possibilities. All these patents show constructions with the defects mentioned above which are inherent in having the tear line or lines exposed.

Several U.S. patents show constructions in which the tear line lies adjacent the edge of the flap, and these include Godley U.S. Pat. No. 1,306,224; Hinchman U.S. Pat. No. 717,993 and Brobst U.S. Pat No. D-26,378. These patents go back more than sixty-five years, and have never achieved success. Moreover, the tear lines of these patents are not really hidden, but lie along the edge of the flap where they may be easily seen.

Lastly, the patent to Bielawski U.S. Pat. No. 4,093,074 discloses two embodiments of envelopes which, while significantly improved compared to other prior constructions, still do not solve the problems outlined above. In the embodiment of FIGS. 1-3, a special and relatively complex blank must be used resulting in an unduly expensive envelope, and also the envelope lacks security because of the limited gluing area, which incidentally must be carefully aligned with relatively small dog-ear flaps. The embodiment of FIGS. 4-6 requires instructions as to how the envelope is to be opened, as it is unnatural to attempt to open the lower part of the body of the envelope. In addition, because of the location of the tear lines in this embodiment, the construction is limited to only certain kinds of envelopes, and such a construction is not available to a wide variety of envelope constructions.

SUMMARY OF THE INVENTION

It is, accordingly, an object of the invention to overcome deficiencies in the prior art, such as those indicated above.

It is another object of the invention to provide for the simplified opening of adhesive sealed enveloped in an easy, safe and quick manner.

It is a further object of the present invention to produce an improved envelope by which removal of the contents is facilitated because, upon opening, the area where the glued part of the envelope is attached becomes removed thereby increasing the size of the access opening.

It is still a further object of the present invention to provide an improved envelope which enables easier handling so that a person who must handle a great number of envelopes can handle them faster compared with existing envelopes.

It is still another object of the instant invention to provide an aesthetically pleasing envelope which, in terms of psychology and human engineering, offers recipients a pleasant surprise.

It is yet another object to provide an improved envelope which can be used as a return envelope.

The above and other objects are achieved with an envelope construction in which a tearable perforation or tear line is placed on the envelope body beneath the envelope closable flap which carries the adhesive area. The tear line is covered and the appearance of the envelope is of a natural, unperforated envelope. Yet when it is time to open the envelope, and it is pulled at the flap in the natural way, the envelope opens quickly and easily, providing an enlarged opening with ready access to the papers within the envelope. Upon such reopening, the recipient need not attempt to separate the flap from the body of the envelope, but merely by lifting up the flap in the natural way the tear line therebeneath separates to provide the desired opening.

The location of the tear line on the body of the envelope is an essential and crucial characteristic of the invention. This type of separation means must be located beneath the closure flap and preferably beneath the closure adhesive (in the closed and sealed envelope) for the following reasons. First, after the adhesive area of the flap becomes moistened and is pressed onto the tear-away portion, the dried flap gains weight and becomes heavier. This weight accelerates the speed and diminishes the force required to lift up the flap along the tear lines and with the tear-away portion of the envelope (defining its mouth) adhered thereto.

Second, in terms of security, the safety of the envelope is improved. The casual observer, who might be intent on tampering with the envelope, would not realize that it is an easily openable envelope because the tear line is covered by the flap. Moreover, during the handling period, the score line is desirably firmly glued to the flap, so that the envelope cannot reopen itself accidentally. It can be reopened only with the application of positive force.

For a better understanding of the invention, as well as the above and other objects and the nature and advantages of the instant invention, several embodiments thereof will now be described with reference to the attached drawing, it being understood that these embodiments are intended as merely exemplary, and in no way limitative.

BRIEF DESCRIPTION OF DRAWINGS

FIG. 1A is a plan view of a blank for making a first envelope embodiment according to the invention;

FIG. 1B shows the folded and pasted blank forming an envelope ready for use;

FIG. 1C schematically shows the sealed envelope of FIG. 1B;

FIG. 1D is a plan view of the reopened envelope of FIG. 1C;

FIGS. 2A–2E are plan views of tear lines which are suitable for use in conjunction with the present invention;

FIG. 3A is a plan view of a blank for use in the construction of an envelope according to the invention which can be used for original mail and then reused for return mail;

DESCRIPTION OF EMBODIMENTS

Figure 3B:
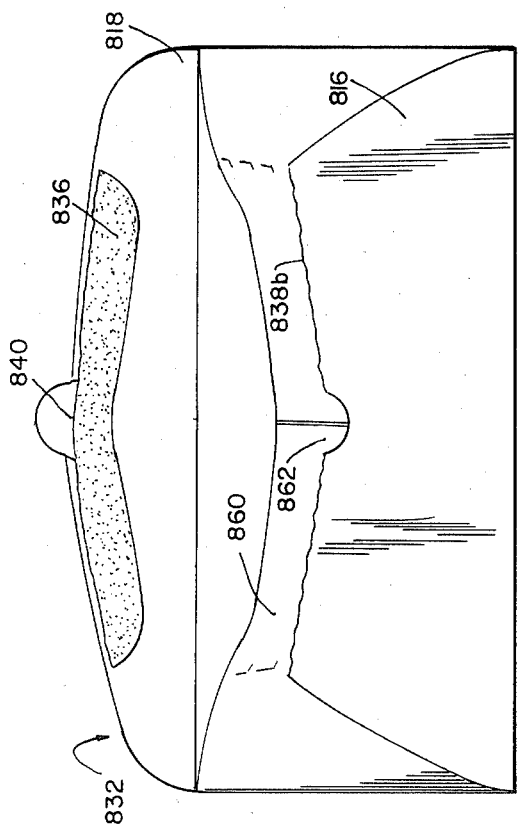
FIG. 3B is a plan view showing of the blank of FIG. 3A partially folded.

With reference to FIG. 1A, there is shown a blank 10 for use in conjunction with forming an envelope according to the present invention. Such a blank 10 may be formed in the conventional manner by die cutting from a larger piece of paper or paperboard. The blank 10 is provided with a pair of side flaps 12 and 14, a bottom flap 16 of special character as described below, a top or closure flap 18 having coated thereon a wet-activatable adhesive over an adhesive area 20, and a front wall panel 22. The usual fold lines 24, 26, 28 and 30 permit rotation of the flaps to form and eventually seal the envelope.

With reference to FIG. 1B, it is seen that to form the envelope 32, the manufacturer folds the side flaps 12 and 14 about their respective hinges 28 and 26, applies suitable paste in spots 34 or in lines, and then folds the bottom flap 16 about its hinge line 28 sealing the overlapping edges of the side flaps 12 and 14 with those of the bottom flap 16, the latter then forming in this embodiment a back wall panel. The envelope is then ready for use by the consumer.

The envelope 32 of the present invention differs from conventional envelopes in the provision of a tear away portion 36 connected to the terminal part of the bottom flap 16 by a suitable tear line 38. An optional gripper or pull tab 40 may be provided for improving the ease of opening the envelope after delivery. It is important that the tear away portion 36 extend a substantial distance across the length of the envelope at the center thereof, and in practice it will normally extend more than half the length of the envelope. It is also desirable that the tear away portion 36 correspond generally to the size and shape of the adhesive area 20 on the closure flap 18.

The precise location of the tear line 38 relative to the free edge 19 of the top flap 18 and the adhesive area 20 is very important according to the present invention. As schematically illustrated in FIG. 1C, the free edge 19 of the top flap 18 extends below the tear line 38 when the envelope is sealed, so that the tear line 38 is hidden. It is also desirable that the gluing area 20 also as least partially overlap the tear line 38, most preferably terminating just slightly below the tear line 38 so that such tear line is completely covered by the adhesive area 20 when the envelope 32 is sealed. This increases the security when the envelope is sealed, and also increases the weight of the top flap 18, surprisingly diminishing the force required to lift up the flap 18 and the tear away portion 36 when the envelope is opened. On the other hand, it is not absolutely essential that the adhesive area 20 cover the tear line 38, as improved results are achieved even when the adhesive area 20 terminates short of the tear line 38, as long as the free edge 19 of the top flap 18 covers the tear line 38.

FIG. 1D shows the reopened envelope with its contents removed. It will be seen that the gripping or pull tab 40 and the tear away portion 36 have remained with the top flap 18 to which they have become adhered by means of the adhesive on the adhesive area 20. The two separated halves of the tear line 38 are designated by the edge 38a of the tear portion 36 and the edge 38b of the bottom flap 16. Comparing FIGS. 1B and 1D, it will be seen that an additinal benefit of the instant invention is the creation of a larger access opening for removing the contents from the envelope 32, this larger opening being created by the removal of the tear away portion 36. It is for this reason, as well as the provision of a secure seal, that the tear away portion 36 should be of substantial length.

Large envelopes of the same general style may be provided of heavy duty construction, which may be formed of paper or paperboard, or even of synthetic material.

When the envelope reaches its destination, the recipient opens it in the natural way, i.e. by grasping the top flap and pulling upwardly. This natural inclination is facilitated by the presence of the gripping or pull tab. When this natural action is effected, the envelope separates along the tear line and the envelope is easily opened. By the removal of the tear away portion, the inside of the envelope becomes more readily accessible.

The principle of the present invention can also be applied to a paperboard mailing box of, for example, a thickness of about ½ inch. The box has a front wall panel and side wall panels (not shown), as well as the back wall panel to which is attached a tear away portion along a tear line. Again, an optional gripping or pull tab may be provided to facilitate opening of the sealed box.

Although a variety of tear lines can be used according to the present invention, including many of known construction, it is nevertheless important that a tear line configuration be selected which will properly propagate the tear once it is started. Various configurations which may be used are shown in FIGS. 2A, 2B, 2C, 2D and 2E. Those of FIGS. 2A, 2B and 2D are somewhat similar and incorporate parallel scores or cuts. The tear line of FIG. 2C uses a series of scallop shaped cuts or scores adjacent one another. The embodiment of FIG. 2E is commonly used for tear-off strips in mailing boxes.

Of those tear lines which are shown in the prior art as mentioned above, those of Pedrick 304,662; Robbins '441 and Nixon et al '538 are exemplary of unsatisfactory tear line configurations which will not successfully propagate a tear once it is started. On the other hand, those of Meeker et al '511 and Kleinfelot '203 are fully satisfactory.

Referring next to FIG. 3A, there is shown a blank 800 for the manufacture of an envelope which can be used twice, once for an original mailing and a second time for a return mailing. The blank 800 comprises a pair of side flaps 812 and 814, and a top flap 818, all of which are hinged to a front wall panel 822. Also provided is a bottom flap 816 not unlike those previously described, which when rotated and adhered to the rotated side flaps 812 and 814 forms a back wall panel for the envelope 800. The bottom flap 816 is provided with a tear away portion 836 connected to the remainder of the bottom flap 816 by a tear line 838.

The blank 800 differs from blanks used to make the envelopes described above, and consequently produces a different type of envelope, in the following respects. First, the tear away portion 836 is itself provided with adhesive, and indeed its entire upper surface, except for the optional gripping or pull tab 840, is desirably coated with adhesive. In addition, the side flaps 812 and 814 are constructed to extend entirely across the length of the envelope 832 as best shown in FIG. 3B. In addition, each of the side flaps 812 and 814 is provided with a tear away portion 860 defined by a tear line 862.

Figure 3D:
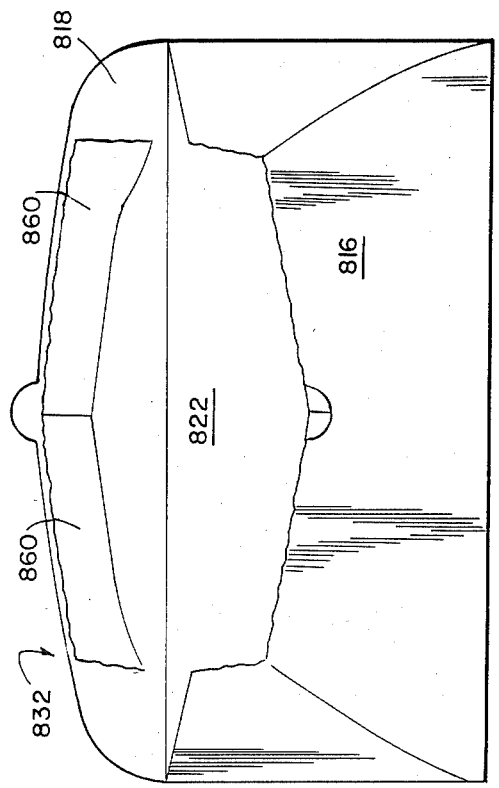
FIG. 3D is a plan view of the envelope of FIG. 3C once used and opened, and prior to its reuse as a return envelope.
Figure 3C:
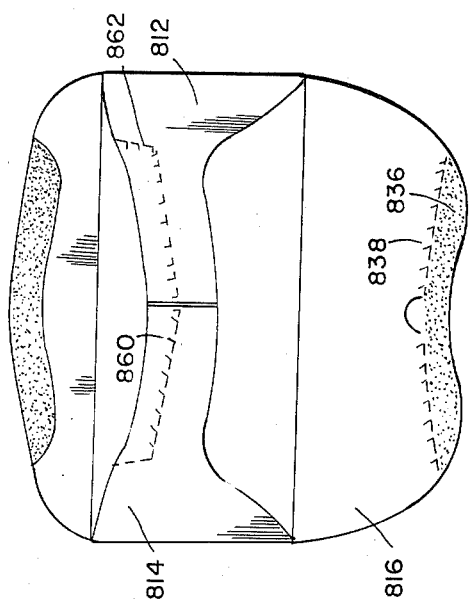
FIG. 3C is a plan view showing the fully folded blank to form a complete envelope prior to its first usage.

With reference to FIG. 3B, the envelope is formed by first folding the panels 812 and 814 and then, as shown in FIG. 3C, by folding the bottom flap 816 upwardly to form the back wall panel, and pasting in the usual way. As shown in FIG. 3C, the tear away portion 836 will then partially overlie the tear away portion 860, the latter of which lies mostly beneath the former as viewed in FIG. 3C. In accordance with usual practice, the first user of the envelope 832, which may be a window envelope, will place the contents in the envelope and will seal it in the normal way. In this regard, please note that the area of adhesive 820 is complementary in shape and configuration to the tear away portion 836 so that in the sealed envelope the top flap 818 will stick solely to the back panel 816, and most especially the tear away portion 836 thereof, and not to the side flaps 812 and 814; in other words, the pattern of adhesive 820 should be such that the top flap 818 will not stick to the exposed areas of the tear away portions 860.

Upon arrival at its destination, the envelope 832 is opened by the recipient in the natural way by pulling the top flap 818, and again this may be facilitated by the presence of the gripping or pull tab 840. The contents are removed and the envelope then has the configuration shown in FIG. 3D. In particular, the tear away portion 836 now has become adhered to the top flap 818, providing a new exposed adhesive area on the portion 836 for reuse of the envelope. In turn, the bottom flap 816 now terminates at the tear edge 838b, thereby exposing therebeneath the tear away portion 860 defined by the tear line 862. In this form, the recipient is then able to reuse the envelope, such as for a return envelope. Contents are placed in the envelope 832, the adhesive on the exposed face of the portion 836 is wetted and the envelope is resealed and dispatched by post or the like.

Figure 3E:
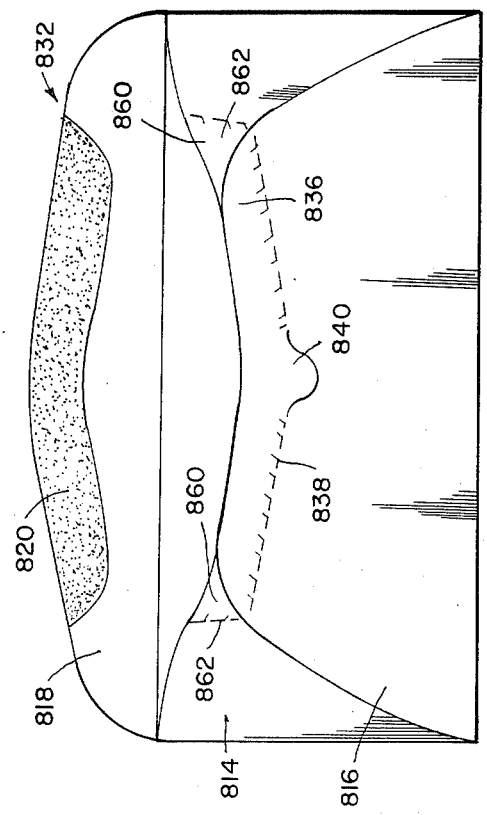
FIG. 3E is a plan view of the envelope of FIG. 3D after it has been reopened.

Upon receipt by the second recipient, again the envelope is opened in the natural way by grasping the flap 818, assisted if present by the pull tab 840, and pulling upwardly. This causes opening of the envelope by separation along the tear line 862 thereby providing the reopened envelope 832 as shown in FIG. 3E. As there shown, the tear away portion 860 has become adhered to the top flap 818 and covers the tear away portion 836.

As indicated above, it will be understood that the envelope of the present invention, in any of its possible forms, provides significant advantages over those of the prior art. It is simple to open the adhesive sealed envelope very easily, safely and quickly. It reduces the time and effort to reopen the firmly sealed envelope. It is easy to take out the contents from the envelope because the access opening becomes enlarged. These advantages are useful for all people receiving mail, but are especially useful for the person who handles a great quantity of envelopes who is able to process these at an increased rate.

The foregoing description of the specific embodiments will so fully reveal the general nature of the invention that others can, by applying current knowledge, readily modify and/or adapt for various applications such specific embodiments without departing from the generic concept, and therefore such adaptions and modifications should and are intended to be comprehended within the meaning and range of equivalents of the disclosed embodiments. For example, it will be understood that the invention is not limited to the size, shape or construction of the envelope, or the material from which it is formed, and the different styles of tear lines can be used.

It is to be understood that the phraseology or terminology employed herein is for the purpose of description and not of limitation.

What is claimed is:

1. In an easily openable envelope having a front wall panel, a rear wall panel, a top flap having an adhesive area for sealing to said rear wall panel, and a tear away portion defined by a tear line, the improvement wherein said tear away portion lies at the upper end of said rear wall panel with said tear line between said tear away portion and the remainder of said rear wall panel, said tear line extending across the central portion of said envelope a distance corresponding to at least half the length of said envelope, said tear line being located so that when said envelope is sealed said tear line is hidden by said top flap and the adhesive area of said top flap overlies at least a substantial part of said tear away portion; and further comprising:

means permitting reuse of said envelope as a mailing envelope, said means comprising a second activatable adhesive on the bottom surface of said tear away portion, and a second tear away portion lying adjacent and beneath said first mentioned tear away portion.

2. An envelope according to claim 1 wherein said tear away portion extends substantially the entire length of said envelope.

3. An envelope according to claim 1 wherein the adhesive area of said flap corresponds generally to the area of said tear away portion.

4. An envelope according to claim 1 wherein said tear away portion is provided with a downwardly directed gripping or pull tab.

* * * * *